United States Patent [19]

Hancu

[11] 4,209,874
[45] Jul. 1, 1980

[54] WINDSCREEN-WIPER BLADE

[75] Inventor: Théodore Hancu, Chene-Bougeries, Switzerland

[73] Assignee: Societe d'Exploitation de Brevets J. B., Fribourg, Switzerland

[21] Appl. No.: 10,779

[22] Filed: Feb. 9, 1979

[30] Foreign Application Priority Data

Feb. 17, 1978 [CH] Switzerland .......................... 1755/78

[51] Int. Cl.² ............................................... B60S 1/40
[52] U.S. Cl. .................................................. 15/250.32
[58] Field of Search ....................... 15/250.32, 250.42; 403/317, 321–324, 154

[56] References Cited

U.S. PATENT DOCUMENTS

| | | | |
|---|---|---|---|
| 726,732 | 4/1903 | Nelson | 403/321 |
| 735,618 | 8/1903 | Tannewitz | 403/321 |
| 2,432,691 | 12/1947 | Smulski | 15/250.32 |
| 3,378,874 | 4/1968 | Scinta | 15/250.32 |
| 3,425,089 | 2/1969 | Quinlan et al. | 15/250.32 |
| 3,641,614 | 2/1972 | Newsome | 15/250.32 |

FOREIGN PATENT DOCUMENTS 44399 7/1956 Fed. Rep. of Germany ........ 15/250.32

Primary Examiner—Robert W. Jenkins
Attorney, Agent, or Firm—James Creighton Wray

[57] ABSTRACT

The windscreen-wiper blade comprises a support equipped with two lateral wings through each of which a hole passes, the two holes being aligned on an axis perpendicular to the said wings. The support carries a locking piece sliding longitudinally between the wings while remaining opposite to the two holes and comprising a transverse opening prolonged by a transverse opening of greater height. The locking piece can occupy two stable positions in which each of the openings is respectively opposite to the two holes of the support.

The holes of the support are prolonged by collars and the support is provided with a pair of slots in the region of the holes whereby the two wings of an intermediate piece provided with cut-away portions of circular arc form capable of introduction into said slots can engage around said collars to secure said wiper assembly to said wiper arm.

This blade is particularly intended for the equipment of windscreen wipers of automobile vehicles.

3 Claims, 6 Drawing Figures

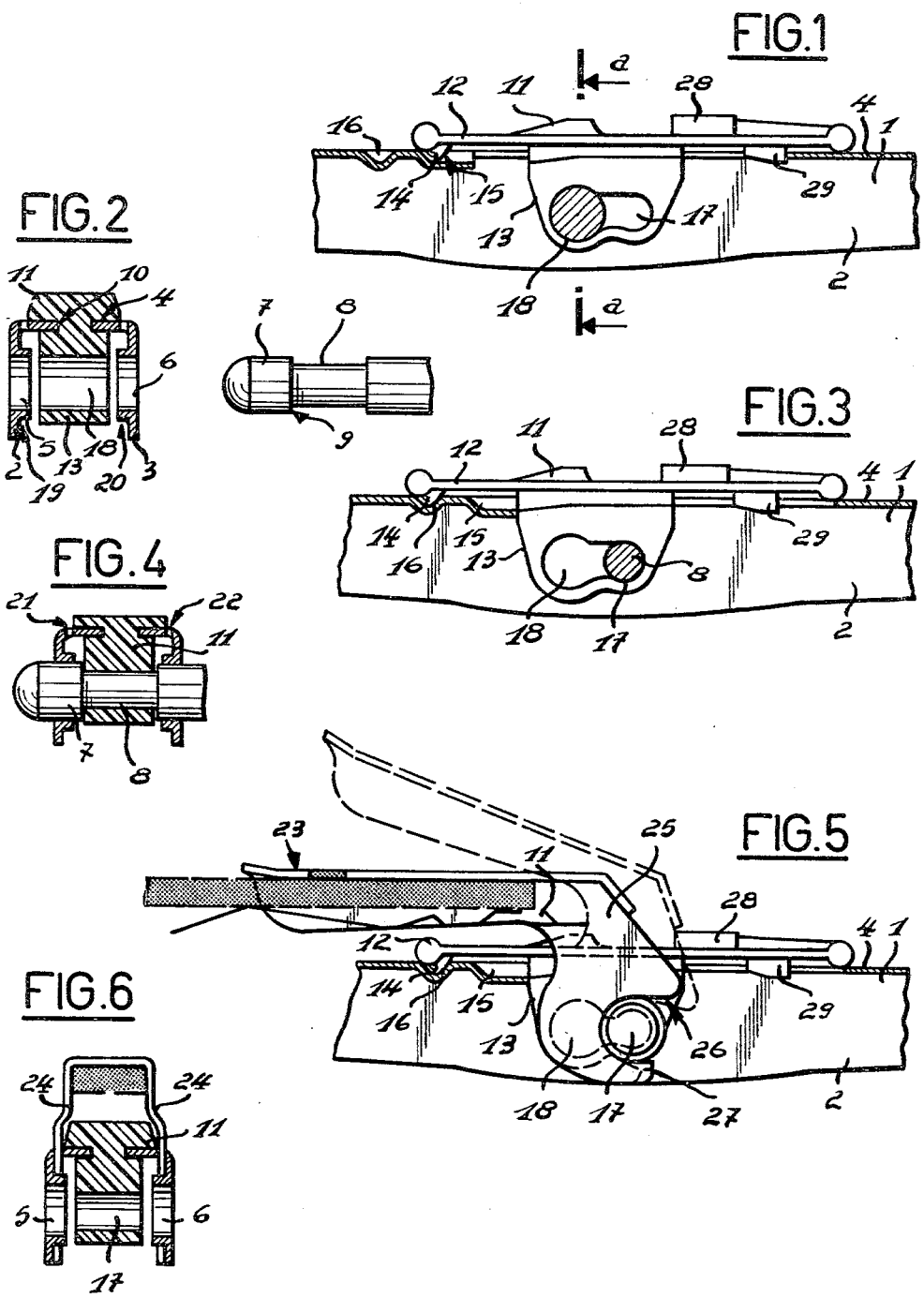

WINDSCREEN-WIPER BLADE

BACKGROUND TO THE INVENTION

The present invention relates to improvements in wipers for automobile vehicles and more precisely to the detachable fitting of a windscreen-wiper blade on the extremity of an oscillating arm.

Such windscreen wipers are known in which the oscillating arm comprises at its free end a transverse spindle or prolongation intended to be lodged in a bore formed in the support of the blade, which blade comprises a transverse locking system permitting pivoting of the blade about the spindle.

The known locking systems of this type (see Japanese Utility Model No. 10710/1964 published the 24th Apr. 1964) in general comprise a leaf spring fixed to the body of the blade and pressing upon the spindle or prolongation of the arm which terminates with a stop which prevents any transverse displacement of the blade in relation to the arm until the leaf spring has been pressed aside.

Such a locking system is relativey irksome by reason of the use of a leaf spring and its fixing on the blade support, generally by riveting. Moreover it lends itself with difficulty to adaptation of the same blade to an arm of a different type which does not comprise a transverse extremity.

OBJECTS OF THE INVENTION

The invention aims at obtaining a wiper blade of the above type which is of simplified and less irksome manufacture, reliable in operation and can if necessary easily be adapted to arms of different types.

SUMMARY OF THE INVENTION

According to the invention there is provided a wiper assembly comprising a support channel having a longitudinal wall and two lateral wings through each of which a hole passes, the two holes being aligned on an axis perpendicular to said wings, collars extending from the wings towards each other respectively from the marginal regions of said holes, a locking piece carried by said support sliding longitudinally between the wings while remaining opposite to the two holes, said locking piece having a first transverse opening in communication with a second transverse opening of greater height, said locking piece being capable of occupying two stable positions in which each of the openings is respectively opposite to the two holes of the support, two slots provided in said longitudinal wall opposite to the collars respectively, and an intermediate piece having a pair of wings each carrying a cut-away portion of circular arc form capable of introduction into the slots respectively to bring the cut-away portions of circular arc form to press respectively upon the said collars.

When the opening of large dimension is opposite to the holes, the transverse extremity of a windscreen-wiper arm can be introduced into them and by sliding of the locking piece into its other stable position, the opening of smaller dimension is closed over the spindle by elastic deformation or over the transverse extension of the arm, preventing all transverse displacement of the blade in relation to the arm by virtue of the presence of the end stop which the arm comprises.

BRIEF DESCRIPTION OF DRAWINGS

An embodiment of such a windscreen-wiper blade is represented by way of example in the accompanying drawings, wherein:

FIG. 1 is a diagrammatic longitudinal sectional view of a part of a blade according to the invention in the course of fitting upon an arm with transverse spindle, FIG. 2 is a sectional view along the line A—A in FIG. 1, FIGS. 3 and 4 are analogous respectively with FIGS. 1 and 2, but after fitting, FIG. 5 is a diagrammatic lateral elevation showing the fitting of an intermediate attachment on the blade according to FIGS. 1 to 4, and FIG. 6 is a sectional view of the blade according to FIG. 5.

DESCRIPTION OF PREFERRED EMBODIMENT

In these Figures the blade is represented only by its support 1, generally constituted by a metallic or plastic yoke on which small yokes (not shown) carrying a blade rubber are articulated.

The support 1 comprises two lateral wings 2 and 3 interconnected by an upper wall 4. The wings 2 and 3 each comprise a hole, 5 and 6 respectively, the axes of the holes 5 and 6 being coincident and perpendicular to the plane of the wings 2 and 3. The diameter of the holes 5 and 6 permits the passage of a spindle 7 which comprises a central narrowed portion 8 to form a lateral stop shoulder 9. In known manner the spindle 7 is mounted transversely of the extremity of a windscreen-wiper arm (not shown).

The wall 4 is equipped with a longitudinal slot 10 in which there slides a locking piece 11 of plastic material the upper portion 12 of which protrudes to the exterior of the support 1 and the lower portion 13 of which is lodged between the wings 2 and 3. The upper portion comprises a boss 14 which lodges in two recesses 15 and 16 formed on the upper wall 4, so as to maintain the piece 11 in one or the other of the two positions in which it abuts against one extremity of the slot 10, on the one hand, and a boss 29 abutting on the other extremity on the other hand. The passage from the one position to the other is effected by elastic deformation of the piece 11, which ensures a stable maintenance of this piece in each of the two positions. The recess 15 on the wall 4 is elongated and opens into the slot 10 to facilitate the fitting of the locking piece 11 without deterioration of the boss 14.

The portion 13 of the piece 11 is equipped with an elongated transverse opening 17 the height of which is substantially equal to the diameter of the portion 8 of the spindle 7. The opening 17 is terminated by a transverse opening 18 of diameter larger than that of the spindle 7. The openings 17 and 18 are disposed on the piece 11 in such manner that they can come opposite to the holes 5 and 6, the opening 17 being between these holes for one of the positions of the piece 11 (FIGS. 3 and 4) whereas the opening 18 is between these holes for the other position of the piece 11 (FIGS. 1 and 2).

In this latter position the spindle 7 can be introduced into the holes 6 and 5, passing through the opening 18. If the piece 11 is slid to bring it to its other stable position, the opening 17 surrounds the narrowed portion 8 of the spindle 7 and by abutment against the shoulder 9 of the spindle 7 the blade is translationally locked on the spindle 7, while being capable of pivoting thereon.

The blade as just described permits, with minor conversion, adaptation of an intermediate piece intended to be fixed to the extremity of a windscreen-wiper arm which does not comprise a transverse spindle or extension.

To this end the holes 5 and 6 are each prolonged by an inwardly turned collar 19 and 20 respectively, which can be formed by stamping in the piercing of the holes. The collars 19 and 20 could equally be turned upwards. The wall 4 comprises, on each side of the slot 10, two parallel slots 21 and 22. An intermediate piece 23 comprises two parallel wings 24 attached to a body 25 equipped with means for fixing to a windscreen-wiper arm.

The wings 24 comprise a cut-away portion 26 of circular arc form, the diameter of which corresponds to that of the collars 19 and 20, and terminate with a point 27 opposite to the body 25.

The locking piece 11 comprises an excess thickness 28 in its upper part which is used for its actuation.

In the position of the piece 11 as represented in FIGS. 1 and 2, the points 27 of the wings 24 can be introduced into the slots 21 and 22 respectively. The cut-away portions 26 lodge around the collars 19 and 20 respectively and the intermediate piece 23 can pivot in relation to the support 1 about the axis constituted by these collars. If after the piece 23 has been pushed down into the position represented in solid lines in FIG. 5, the locking piece 11 is slid to bring it into the position according to FIGS. 3 and 4, the relative rotation of the piece 23 brings the extremity of the body 25 situated between the wings 24 to abut upon the excess thickness 28 (position represented in chain lines in FIG. 5). The intermediate piece 23 cannot be extracted from the slots 21 and 22 since it is inclined and is locked between the collars 19 and 20 on the one hand and the extremities of the slots 21 and 22 on the other. It is only by returning the locking piece 11 into its first position that the intermediate piece 23 can pivot completely and be separated from the support 1.

I claim:

1. A wiper assembly comprising:
   (a) a support channel having a longitudinal wall and two lateral wings through each of which a hole passes, the two holes being aligned on an axis perpendicular to the said wings,
   (b) collars extending from the wings towards each other respectively from the marginal regions of said holes,
   (c) a locking piece carried by said support sliding longitudinally between the wings while remaining opposite to the two holes, said locking piece having a first transverse opening in communication with a second transverse opening of greater height, said locking piece being capable of occupying two stable positions in which each of the openings is respectively opposite to the two holes of the support,
   (d) two slots provided in said longitudinal wall opposite to the collars respectively, and
   (e) an intermediate piece having a pair of wings each carrying a cut-away portion of circular arc form capable of introduction into the slots respectively to bring the cut-away portions of circular arc form to press respectively upon the said collars.

2. A wiper blade assembly according to claim 1, wherein the sliding piece is of plastic material and comprises means for indexing in relation to the support to maintain it in each of the two stable positions.

3. A wiper assembly according to claim 1, wherein the locking piece, in the one of the stable positions, forms a rotational abutment for the intermediate piece and prevents its withdrawal, whereas in the other position it does not prevent introduction and withdrawal of the said intermediate piece.

* * * * *